United States Patent
Castellanos Zamora et al.

(10) Patent No.: US 8,572,258 B2
(45) Date of Patent: Oct. 29, 2013

(54) CONTROL OF QUALITY-OF-SERVICE PRECONDITIONS IN AN IP MULTIMEDIA SUBSYSTEM

(75) Inventors: David Castellanos Zamora, Madrid (ES); Magnus Hallenstål, Täby (SE); Per Öberg, Nacka (SE); Hubert Przybysz, Hägersten (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 301 days.

(21) Appl. No.: 12/812,665

(22) PCT Filed: Jan. 15, 2008

(86) PCT No.: PCT/EP2008/050395
§ 371 (c)(1),
(2), (4) Date: Jul. 13, 2010

(87) PCT Pub. No.: WO2009/089904
PCT Pub. Date: Jul. 23, 2009

(65) Prior Publication Data
US 2010/0287285 A1   Nov. 11, 2010

(51) Int. Cl.
*G06F 15/16* (2006.01)

(52) U.S. Cl.
USPC ............... 709/227; 709/217; 709/223

(58) Field of Classification Search
USPC .................. 709/201–205, 217–232
See application file for complete search history.

(56) References Cited

U.S. PATENT DOCUMENTS

| | | | |
|---|---|---|---|
| 7,542,461 B2 * | 6/2009 | Oran | 370/352 |
| 2007/0004388 A1 * | 1/2007 | Veikkolainen | 455/414.1 |
| 2007/0204050 A1 * | 8/2007 | Liu et al. | 709/230 |

* cited by examiner

*Primary Examiner* — Yasin Barqadle

(57) ABSTRACT

The invention relates to a method of establishing a session between client user terminals accessing IP Multimedia Subsystem, IMS, networks. At least one of the IMS networks implements the use of Quality of Service, QoS, preconditions, and at least one of the client user terminals does not use QoS preconditions. The method includes receiving, at an inter-working function, IWF located in one of the IMS networks, an IMS session initiation request originated by an originating client, the request indicating a terminating client for the session. A decision is made, based on the session initiation request, that one of the originating client and the terminating client is not using QoS preconditions. A set of QoS preconditions is inserted into a procedure for establishing the IMS session on behalf of the client that is not using QoS preconditions. Session establishment is completed only after QoS resources complying with the set of QoS preconditions have been established.

32 Claims, 10 Drawing Sheets

CONTROL OF QUALITY-OF-SERVICE PRECONDITIONS IN AN IP MULTIMEDIA SUBSYSTEM

TECHNICAL FIELD

The present invention relates to the provision of services utilising the IP Multimedia Subsystem in an IMS network that implements the use of Quality of Service preconditions.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session.

The IMS makes use of the Session Initiation Protocol (SIP) to set up and control calls or sessions between user terminals. The Session Description Protocol (SDP), carried by SIP signals, is used to describe and negotiate the media components of the session. Whilst SIP was created as a user-to-user protocol, the IMS allows operators and service providers to control user access to services and to charge users accordingly.

FIG. 1a illustrates schematically how the IMS fits into the mobile network architecture in the case of a General Packet Radio Service (GPRS) access network. As shown in FIG. 1a control of communications occurs at three layers (or planes). The lowest layer is the Connectivity Layer 1, also referred to as the bearer plane and through which signals are directed to/from user equipment, UE, accessing the network. The entities within the connectivity layer 1 that connect an IMS subscriber to IMS services form a network that is referred to as the IP-Connectivity Access Network, IP-CAN. The GPRS network includes various GPRS Support Nodes (GSNs). A gateway GPRS support node (GGSN) 2 acts as an interface between the GPRS backbone network and other networks (radio network and the IMS network). The middle layer is the Control Layer 4, and at the top is the Application Layer 6.

The IMS 3 includes a core network 3a, which operates over the middle, Control Layer 4 and the Connectivity Layer 1, and a Service Network 3b. The IMS core network 3a includes nodes that send/receive signals to/from the GPRS network via the GGSN 2a at the Connectivity Layer 1 and network nodes that include Call/Session Control Functions (CSCFs) 5, which operate as SIP proxies within the IMS in the middle, Control Layer 4. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF. The top, Application Layer 6 includes the IMS service network 3b. Application Servers (ASs) 7 are provided for implementing IMS service functionality The IMS architecture makes it possible to deploy peer-to-peer applications where two or more users exchange data during a SIP session. Examples of such peer-to-peer applications include Multimedia Telephony (MMTel), Push to Talk over Cellular (PoC), streaming, real-time video sharing, file sharing, gaming etc. The transport connection(s) is (are) negotiated dynamically by means of the SIP/SDP protocol exchange between the two end points (user terminals).

However, in order to support such peer-to-peer applications, there are two basic requirements: (i) a mechanism is needed to selectively control the SIP signal flows associated with the IMS session(s) of a subscriber; and (ii) a functionality is needed to control the IP flows through the dynamically negotiated transport connections in order to apply an effective charging for usage of services.

To meet these requirements, 3GPP defined, during Release 7, a Policy and Charging Control (PCC) Architecture (see 3GPP TS 23.203). FIG. 1b presents the basic outline of the PCC architecture. The Application Function (AF) 16 is an element offering applications that require dynamic policy and/or charging control of bearer plane resources. Although the application services are initiated and service characteristics are negotiated at the Application Layer 6 (e.g. by an Application Server 7—see FIG. 1a), in the case of the IMS the P-CSCF plays the role of the AF 16 at the SIP signaling plane (Control Layer 4). A Policy and Charging Enforcement Function (PCEF) 12 in the Connectivity Layer 1 monitors service data flow and enforces network policy on the user plane traffic. The PCEF 12 also applies charging based on the monitored data flow and the charging policy applied. This information is provided to an Online Charging System 13 over the Gy interface. Within a GPRS access network, the PCEF 12 is located in the GGSN 2a. Within the Systems Architecture Evolution defined in 3GPP Release 8, the PCEF is located in the PDN gateway.

A Policy and Charging Rules Function (PCRF) 14 resides in between the AF 16 and the PCEF 12. The PCRF 14 is the entity that controls charging based on the monitored data flow. The PCRF 14 obtains rules relating to the charging policy to be applied for particular subscribers over the Sp interface from a Subscription Profile Repository (SPR) 18, which includes a database of subscriber information. The PCRF 14 installs these PCC rules at the PCEF 12 over the Gx interface. These ensure that only authorized media flows associated with the requested services are allowed. In addition, the PCC rules installed at the PCEF 12 ensure that the right bandwidth, charging and priority are applied through the right bearer.

Once session characteristics are negotiated between the communication peers and the session characteristics are authorized within the IMS Core Network 3a, the AF 16 provides to the PCRF 14 an authorization of bearer resources over the Rx interface so that the corresponding resource reservation can be authorized at the Connectivity Layer 1. Note that, depending on the capabilities of the User Equipment, the capabilities of the Connectivity Layer 1 and operator policies, the establishment of the bearer may be initiated by the network (the Bearer Control Mode for the IP-CAN is network-initiated), or may be initiated by the User (the Bearer Control Mode for the IP-CAN is UE-initiated).

An important consideration is the resources required for the session, particularly the bearer plane resources, which will impact on the Quality of Service (QoS) provided for the session (e.g. the data rate at which data is transferred between the end users). The term QoS is used to refer to those parameters of a requested or on-going session that determine the Quality of the session Service experienced by the end user. The bearer resources applied, such as the available bandwidth for the session, are the principal parameters that determine the QoS of a session.

3GPP has adopted the concept of a QoS Preconditions framework (as defined by the Internet Engineering Task Force, IETF, in RFC 3312) for use with IMS session establishment. QoS preconditions are constraints (e.g. constraints on the minimum resources that must be satisfied before the session can be established), which are introduced during the session initiation. The recipient of the session initiation request (e.g. SIP INVITE) generates an answer, but does not alert the user or otherwise proceed with session establishment until the QoS preconditions are met. A session that is established with QoS preconditions satisfied is referred to as a "QoS-Assured" session.

FIG. 2a illustrates the signal flows that occur in setting up a session when there are no QoS preconditions. The client and network entities indicated at the head of each column have the same reference numerals as shown in FIGS. 1a and 1b. At step 201 an IMS client A, registered with an IMS network A, sends a session initiation request in the form of a SIP INVITE, which is routed through the GGSN 2a and the PCRF 14 to the IMS Core network A. The SIP INVITE indicates that Client A wishes to initiate a session with IMS Client B, who is accessing IMS network B, but does not include any preconditions. The IMS Core A forwards the SIP INVITE to IMS Core B at step 202, and this is routed through the PCRF 14 and GGSN 2a of network B to Client B at step 203. Provided that Client B is registered with IMS network B, Client B's user terminal rings (step 204). At steps 205 to 207, a SIP 180 Ringing message is routed back through networks A and B to Client A, who returns a SIP PRACK acknowledgement (steps 208-210). The session establishment is then completed when the user answers and (step 211) and a SIP 200OK message is sent from Client B to Client A (steps 212-214), which is acknowledged by a SIP ACK message returned by Client A (steps 215-217). Note that since the QoS Precondition Framework was not used in the IMS Session set-up, the availability of specific QoS resources does not need to be ensured before the user is alerted.

FIG. 2b illustrates the signal flows that occur in the equivalent situation to that shown in FIG. 2a, but setting up a "QoS-Assured" session making use QoS preconditions. The client and network entities indicated at the head of each column have the same reference numerals as shown in FIGS. 1a and 1b. At step 221 IMS client A, sends a SIP INVITE, indicating that Client A wishes to initiate a session with IMS Client B, and including an indication of preconditions. At this stage the preconditions indicated are NOT MET (because no bearer resources have yet been assigned) and a media "inactive" indication is included in order to prevent media data signals from flowing. The IMS Core A forwards the SIP INVITE to IMS Core B at step 222, and this is routed on to Client B at step 223. At this point Client B's user terminal does not ring because QoS Preconditions are required and not yet fulfilled. Instead, at step 224 Client B responds with a SIP 183 Session Progress message. In this example, this includes a similar indication that the specified QoS preconditions are supported by Client B, but are likewise NOT MET and a media "inactive" indication. The SIP 183 message is routed back to Client A (steps 225 and 226), who returns a SIP PRACK acknowledgement (steps 227-229) and Client B responds by sending a SIP 200OK message to Client A (steps 230-232). The required bearer resources are then reserved for the session by both networks A and B (this step is not shown in FIG. 2b, but will be discussed in more detail in relation to embodiments of the invention below).

At step 233 Client A sends a SIP Update message once its required QoS resources are available, which includes an indication that the QoS preconditions are MET and an indication that the media is now "active". That is to say that the QoS parameters assigned to the session by network A satisfy the QoS preconditions specified in the original SIP INVITE at step 221. The message is forwarded to client B (steps 234 and 235). In this example, at step 236 Client B has completed reservation of required QoS resources and responds with a SIP200OK message that includes a similar indication that the preconditions are MET and media is "active" based on the QoS parameters assigned to the session by network B, which is routed back to client A (steps 237 and 238). Client B's terminal can then ring (step 239) and send a SIP 180 Ringing message back to client A (steps 240-242). When Client B answers, at step 243, the session establishment is completed by Client B sending a SIP 200OK message (steps 244-246), which is acknowledged by a SIP ACK message returned by Client A (steps 247-249).

The set-up of a "QoS-Assured" session will not be completed until the required resources have been allocated to the session. Thus, to establish a "QoS-Assured" session, each client's user equipment UE (e.g. mobile terminal) must successfully establish a bearer for the media stream that complies with the QoS preconditions defined in the session initiation messages (steps 221 and 224 of FIG. 2b) before it can indicate a successful response to complete the session establishment and notify the other client or end point.

In the session set-up without QoS preconditions shown in FIG. 2a, the terminating Client B rings and answers at any time after receiving the initial INVITE, but if the originating side does not yet have the required resources to handle the IMS call, the user behind Client B will not get any response from the user behind Client A when it answers the call. This is what is known as "ghost ringing". However, setting up a "QoS Assured" session, as shown in FIG. 2b, has the advantage of providing an effective and interoperable way of establishing IMS sessions without the risk of "ghost ringing". This is because the terminating user (Client B in FIG. 2b) will not be alerted (terminal will not ring) until the required resources have been allocated to both end-points. Set-up of SIP sessions that do not use the "QoS Precondition" framework (as shown in FIG. 2a) presents a high risk of "ghost ringing". In order to avoid such a risk, and the subsequent user complaints, an IMS network operator may decide to enforce the use of QoS Assured Sessions on its system (this may also be a requirement forming part of Inter-operator Service Level Agreements).

However, as the following examples indicate, it is not always possible to make use of "QoS Preconditions" in the establishment of a session.

- A Push-to-talk over Cellular (PoC) client may be configured not to signal "QoS Preconditions" within the set-up of a PoC session (according to 3GPP technical report TR 23.979).
- An external SIP client (i.e. external to the 3GPP networks domain) that does not support the QoS Precondition framework may try to establish a session with a 3GPP client. "QoS Preconditions" will not be used in this case.
- A SIP Client that does not have access to the underlying bearer layers (for example, a client using a so-called split terminal) cannot make use of the "QoS Precondition" framework because it will not be notified when related resources become available.

Users such as these, that do not support the QoS Precondition Framework, are not at present able to take part in sessions over the IMS domain, where the operators enforce QoS-Assured sessions.

The present invention has been conceived with the foregoing in mind.

SUMMARY

According to a first aspect of the invention, there is provided a method of establishing a session between client user terminals accessing IP Multimedia Subsystem, IMS, networks. At least one of the IMS networks implements the use of Quality of Service, QoS, preconditions, and at least one of the client user terminals does not use QoS preconditions. The method includes receiving, at an inter-working function, IWF located in one of the IMS networks, an IMS session initiation request originated by an originating client, the request indicating a terminating client for the session. A determination is made that the session initiation request requires the use of QoS preconditions and that one of the originating client and the terminating client is not using QoS preconditions. A set of QoS preconditions is inserted into a procedure for establishing the IMS session on behalf of the client that is not using QoS preconditions. Session establishment is completed only after QoS resources complying with the set of QoS preconditions have been established.

In some embodiments, the IWF is located in the core IMS network with which the originating client is registered.

In such embodiments, when the originating client is not using QoS preconditions within an SDP offer payload of the session initiation request, and where the IWF determines that the terminating client, or IMS network with which the terminating client is registered, requires the use of QoS preconditions, the IWF forwards the SDP offer together with an indication of required QoS preconditions to the IMS network with which the terminating client is registered.

In such embodiments, when the session initiation request includes an SDP offer including an indication that the originating client supports use of preconditions, and the IWF determines that the terminating client, or IMS network with which the terminating client is registered, is not using QoS preconditions, the IWF does not allow progress of the session initiation request towards the terminating client. Instead it provides an SDP Answer towards the originating client including an indication of QoS precondition fulfillment at the terminating client together with a request to provide the terminating client with a confirmation of when QoS resources for the originating client become available.

In some embodiments, the IWF is located in a core of the IMS network with which the terminating client is registered.

In such embodiments, when the session initiation request does not contain an indication that the originating client is using QoS preconditions, and where the IWF determines that the terminating client, or IMS network with which the terminating client is registered, requires the use of QoS preconditions, the IWF forwards an offer to establish the session together with an indication of required QoS preconditions, towards the terminating client.

In such embodiments, when the session initiation request includes an indication that the originating client and IMS network with which the originating client is registered supports use of preconditions, and the IWF determines that the terminating client is not using QoS preconditions, the IWF does not allow progress of the session initiation request towards the terminating client. In order to allow the originating client and IMS network to establish required QoS Resources at the originating side, the IWF instead provides an SDP Answer towards the originating client including an indication of QoS precondition fulfillment at the terminating client and a request to provide the terminating client with a confirmation of when QoS resources for the originating client become available.

Embodiments of the invention allow peer-to-peer IMS sessions to proceed, avoiding the risk for ghost ringing even if the originating or terminating UEs do not support the QoS Precondition Framework. It therefore allows operators to provide the services of an IMS system to users of UEs that do not support the QoS Precondition Framework.

According to a second aspect of the present invention there is provided an IP Multimedia Subsystem, IMS, network entity that comprises a Quality-of-Service, QoS, Precondition Inter-Working Function, IWF. The IWF is operable for establishing a session between a client user terminal accessing the IMS network and a client accessing another IMS network, wherein at least one of the IMS networks implements the use of QoS preconditions, and wherein at least one of the client user terminals does not use QoS preconditions. The IWF comprises a processor responsive to receipt of a session initiation request originated by an originating one of the clients, to determine, based on the session initiation request, that the session initiation request requires the use of QoS preconditions and that one of the originating client and the terminating client is not using QoS preconditions, and to insert a set of QoS preconditions into a procedure for authorising QoS resources to be established for the session on behalf of the client that is not using QoS preconditions. The IWF ensures that session establishment is completed only after QoS resources complying with the set of QoS preconditions have been established.

DETAILED DESCRIPTION

Embodiments of the invention include, within the IMS Core domain, a QoS Preconditions Interworking Function (QoS-IWF), which enables the IMS operator to provide a service allowing users to establish sessions that comply with QoS preconditions when the client terminals do not use, or are incapable of using, QoS preconditions. The QoS-IWF is preferably located in the IMS network and acts on behalf of the client terminal for the purpose of applying QoS preconditions and establishing QoS-Assured sessions.

Figure 1A:
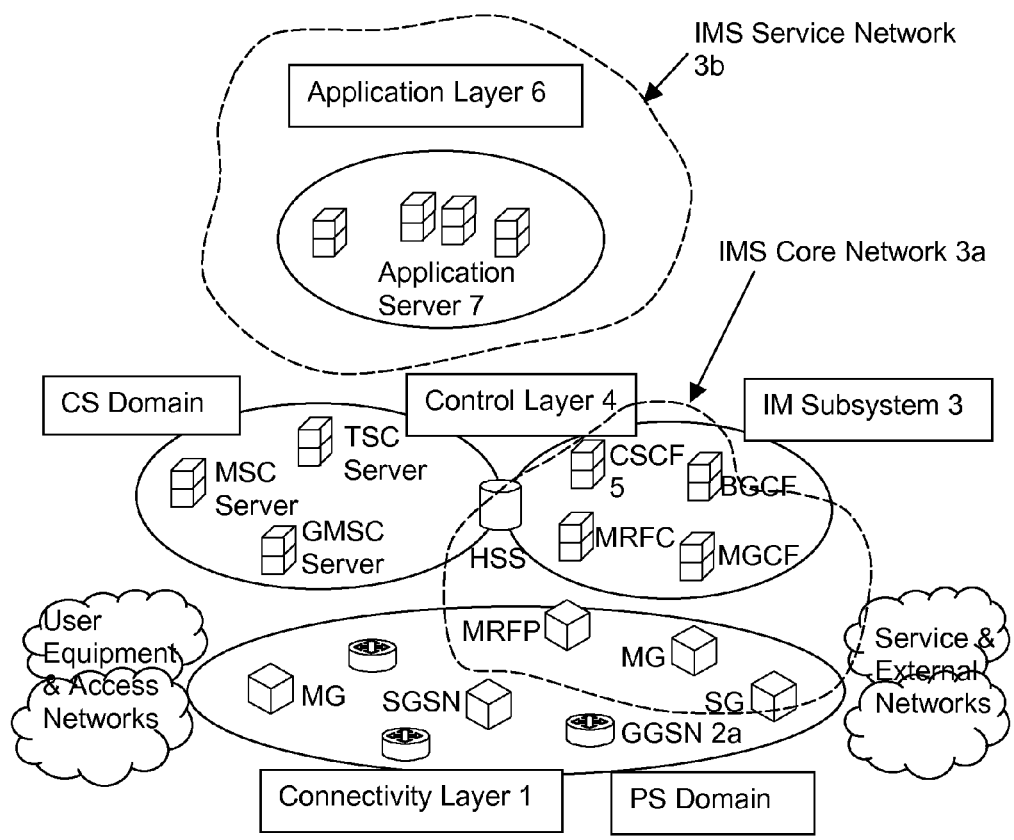
FIG. 1a is a schematic depiction of an IMS network in association with a mobile network architecture of a General Packet Radio Service (GPRS) access network.
Figure 1B:
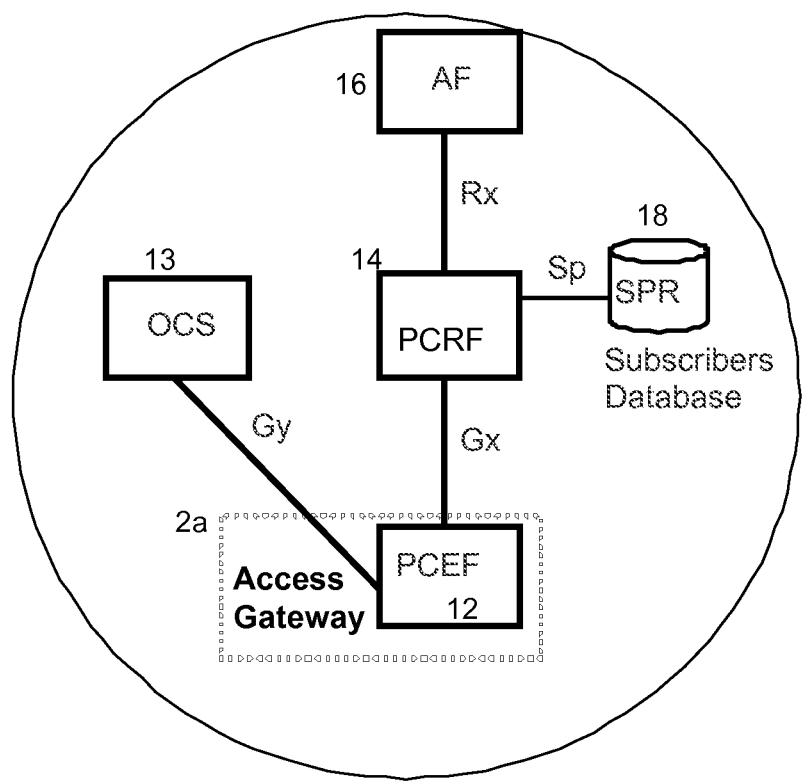
FIG. 1b is a schematic outline depiction of a Policy and Charging Control (PCC) Architecture.
Figure 2A:
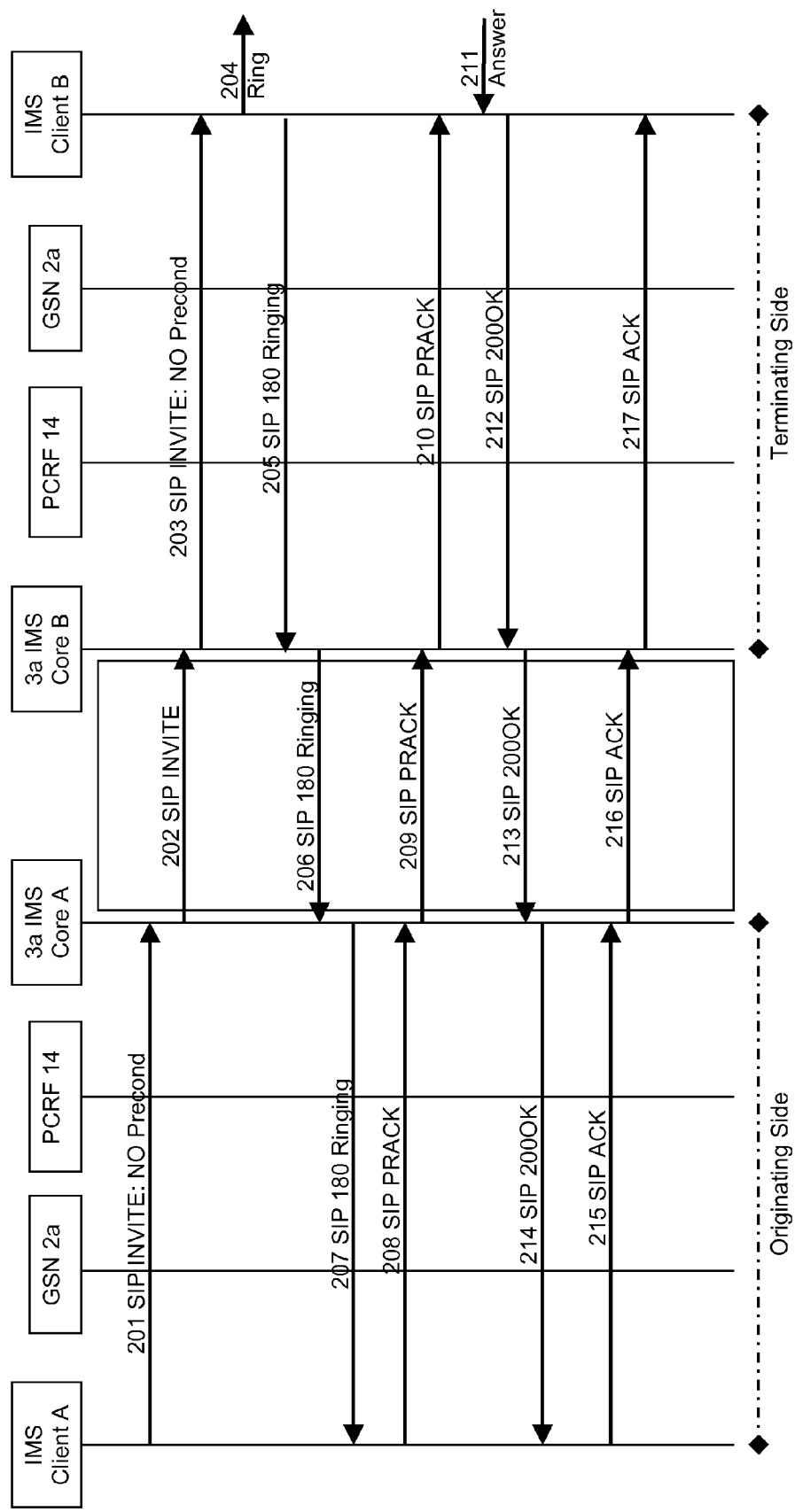
FIG. 2a illustrates the signal flows that occur in setting up an IMS session when there are no QoS preconditions
Figure 2B:
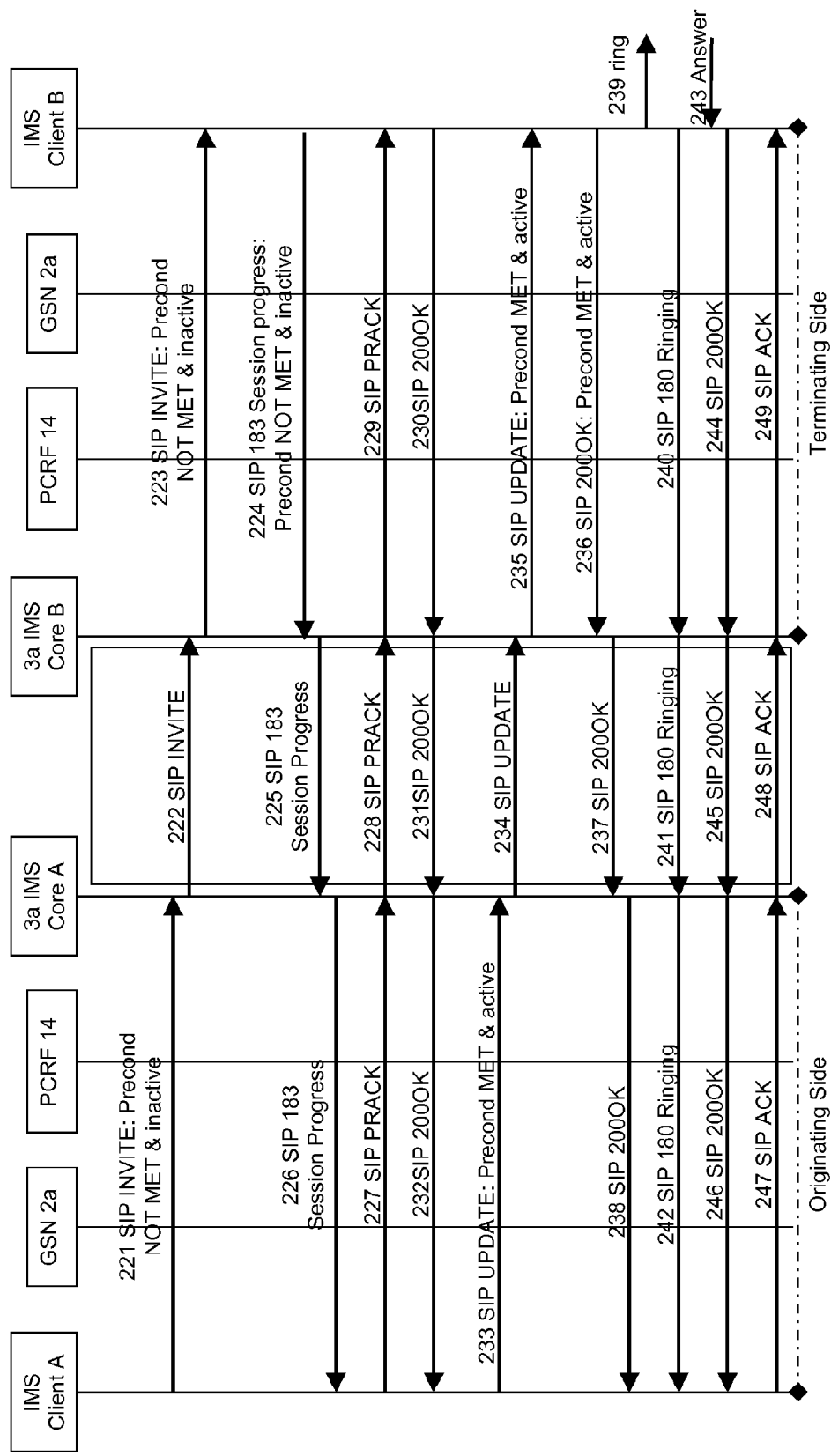
FIG. 2b illustrates the signal flows that occur in the equivalent situation to that shown in FIG. 2a, but setting up a "QoS-Assured" session making use QoS preconditions.

In embodiments of the invention, the QoS-IWF includes the following:

means for determining whether a particular type of request requires assured QoS (based on the type of request, information included in the request, destination domain and IMS operator policies);

means for determining that an endpoint is not using or is incapable of using QoS preconditions on its own;

means for controlling QoS Precondition signaling during session set-up and modification when the local or remote user terminal does not support/use QoS preconditions; and means for controlling the resource reservation at the bearer level so that resources that comply with QoS Preconditions can be assigned and updated accordingly. Where there is an evolved underlying PCC infrastructure (PCRF/PCEF) as shown in FIG. 2 that performs the resource reservation, this will need to be triggered in response to control signals provided over the Rx interface.

In embodiments of the invention, the QoS-IWF is implemented within the IMS Core domain as close as possible to the user equipment that it will act on behalf of. As the discussion will show, the QoS-IWF may act on behalf of a local client (i.e. one who is registered with the IMS network in which the QoS-IWF is implemented), or on behalf of a remote client/network to establish a session with a local client. When the QoS-IWF acts on behalf of a local client, who may be either the originating or terminating client, it needs to be capable of affecting resource reservation in the underlying bearer layer. In this case, the P-CSCF node is the most suitable for implementation of the QoS-IWF. When the QoS-IWF acts on behalf of a remote network/client (either the originating or terminating network/client), it may be implemented within the P-CSCF but it could also be implemented in a node at the edge of the IMS Core domain instead (e.g. at an IMS Border Control Function—IBCF).

Figure 3:
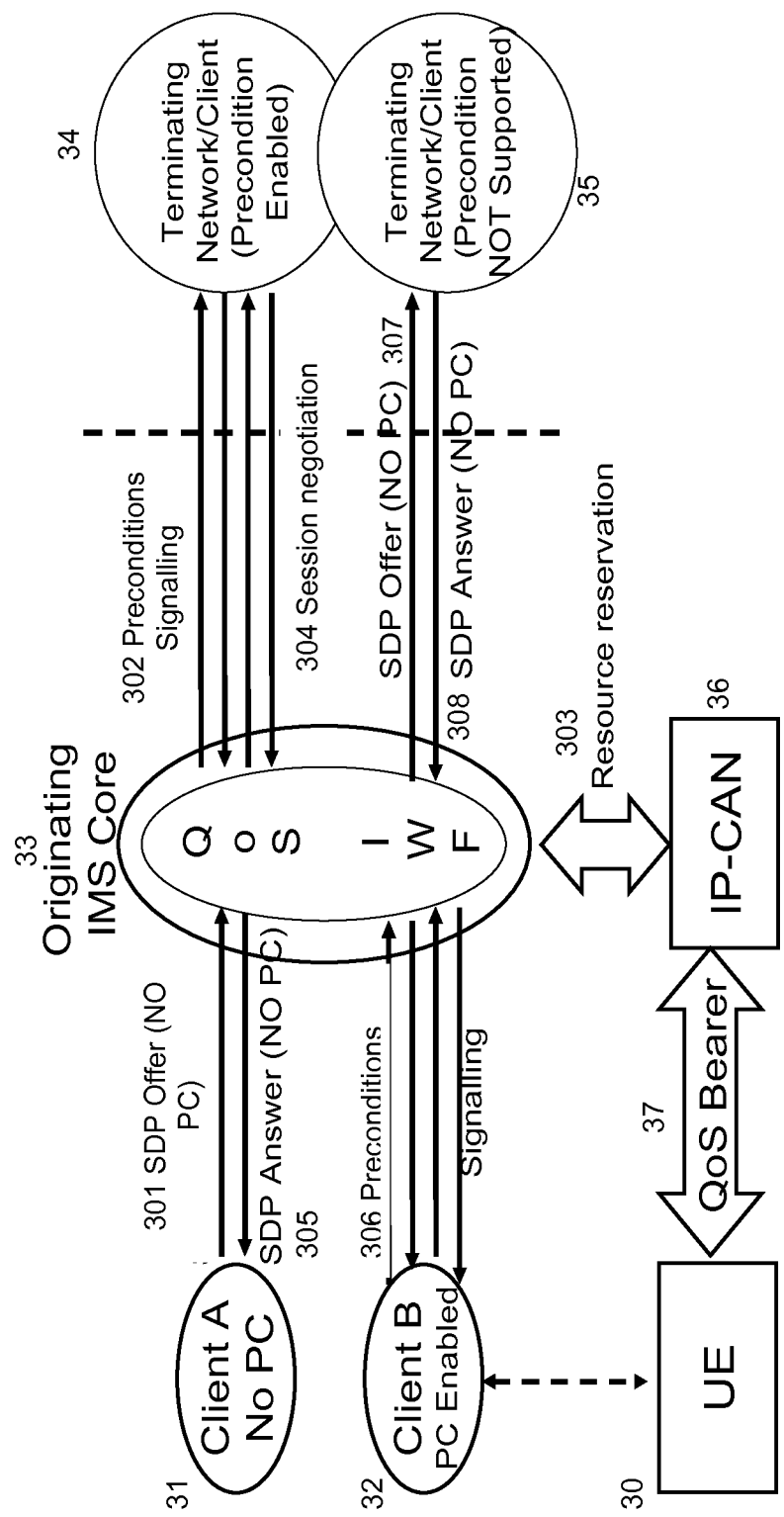
FIG. 3 is a schematic illustration of the principal concepts underpinning embodiments of the invention, in the situation where the control of QoS Preconditions occurs in the originating IMS-Core.

FIG. 3 illustrates the principal concepts underpinning the invention, for the situation where the control of QoS Preconditions occurs in the IMS-Core with which the originating client terminal is registered. This includes allowing user terminals not supporting the QoS Precondition Framework to inter-work in an effective manner (i.e. avoiding the risk for ghost ringing) with a terminating client terminal that supports the establishment of QoS Assured Sessions making use of the QoS preconditions. In addition, it allows originating user terminals supporting the QoS Precondition Framework to inter-work in an effective manner with terminating users that are not capable of using QoS Preconditions.

Referring to FIG. 3, Client A 31, is an IMS SIP Client registered to an IMS network 33. Client A 31 is connected to or imbibed within a UE 30. Client A 31 does not support QoS preconditions. Client A tries to initiate a session with a terminating client 34 by sending, at step 301, an SDP Offer message to the IMS Core network 33, but without any mention of QoS preconditions. If the IMS network enforces the use of QoS-Assured sessions, then the network would simply reject the SDP Offer. Alternatively, if the local IMS network 33 does not enforce QoS-Assured sessions, then the SDP Offer may be progressed towards the terminating Network/Client 34 and rejected there if the terminating IMS Network enforces the use of QoS-Assured sessions. Otherwise, the session would be established in the manner shown in FIG. 2a, with the attendant possibilities for ghost ringing.

In accordance with an embodiment of the invention, the IMS Core network 33 includes an inter-working function, IWF. Thus, at step 302 the SDP Offer is forwarded to the terminating client via its IMS core network including QoS Precondition requirements both for the local and remote endpoints required for the session set-up. Assuming that the terminating client's UE and network 34 are enabled for use of preconditions, the session is negotiated using appropriate QoS parameters to meet those preconditions (more detail of the signalling involved will be provided below). At step 303, the IMS Core network 33 controls the establishment of the required QoS bearer 37 that will provide the required QoS at the bearer plane via the IP-CAN 36. The IMS Core network 33 can then, at step 304, complete the negotiation of the IMS session with the terminating Network/Client and provide an SDP Answer including an indication that local QoS Precondition requirements have been now fulfilled. Finally, at step 305, the QoS IWF at the Originating IMS Core Network 33 completes the IMS session negotiation by sending an SDP Answer towards the local Client A 31 (without any mention of preconditions). In this way a QoS-Assured session is established that complies with the preconditions negotiated with the terminating client/network, even though Client A 31 is not precondition enabled.

A similar process occurs when Client B 32, who is precondition enabled, tries to initiate a session with a terminating client/network 35 that does not support QoS preconditions.

Here, at step 306, Client B 32 sends an SDP Offer, together with the preconditions required to establish a QoS-Assured session, to the IMS network 33. In accordance with an embodiment of the invention, this SDP offer is intercepted by the QoS-IWF within the IMS core network 33 and is not progressed towards the terminating NW/Client 35 until the originating Client B 32, who continues with the IMS Session set-up, provides an indication that the QoS Preconditions requirements have been fulfilled (i.e. the required QoS bearer 37 is available after execution of step 303 as above). Then at step 307, the inter-working function in the IMS network 33 finally forwards the SDP Offer to the terminating client/network 35, but without the preconditions information. The Terminating Network/Client 35 then completes the IMS Session set-up returning an SDP answer at step 308. In this way a session is established that complies with the preconditions specified by Client B 32, and ghost ringing is avoided even though the terminating client/network 35 is not precondition enabled.

Figure 4:
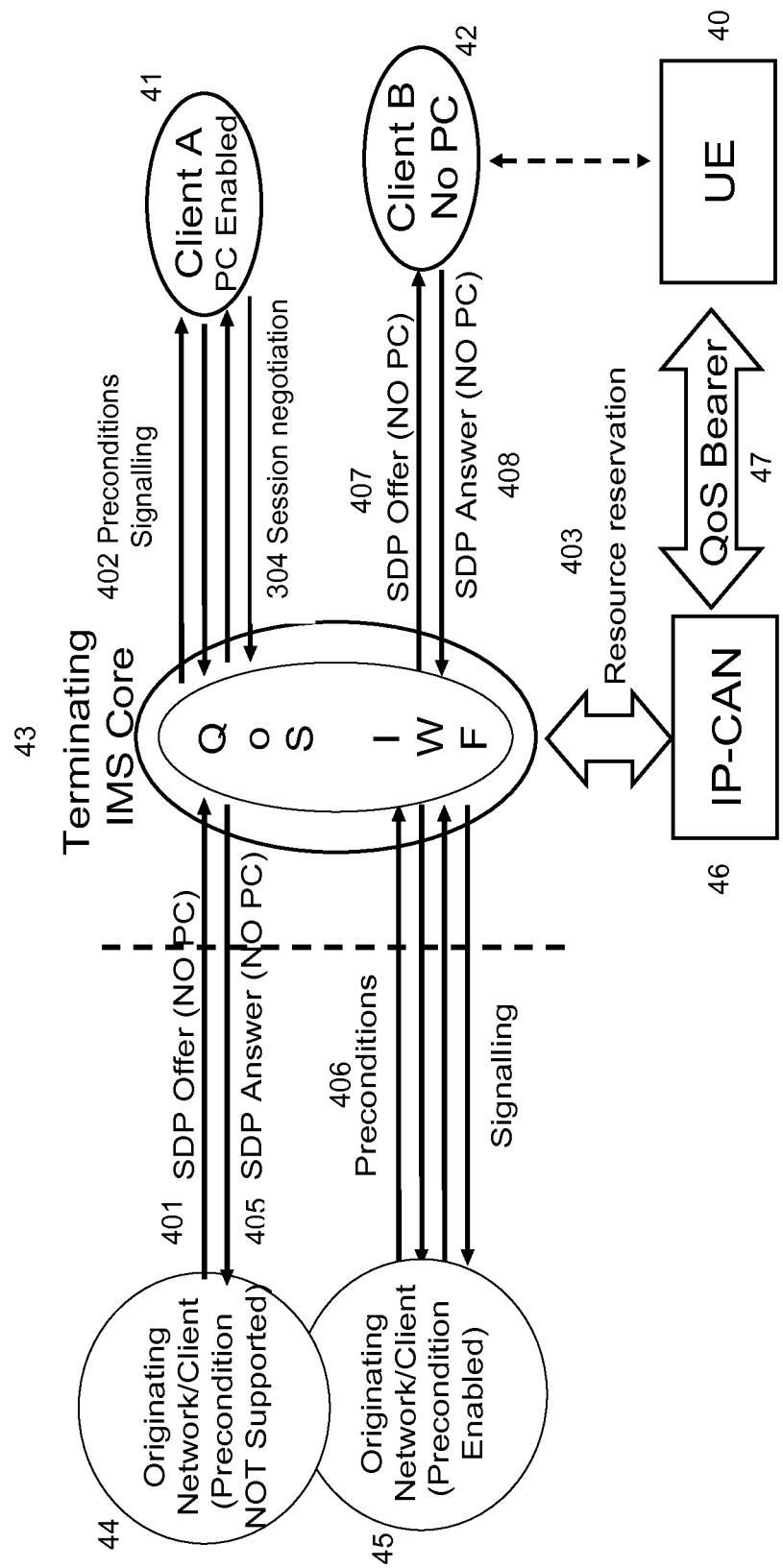
FIG. 4 is a schematic illustration of the principal concepts underpinning embodiments of the invention, in the situation where the control of QoS Preconditions occurs in the terminating IMS-Core

As shown in FIG. 4, a similar situation arises when the session is originated by a client of a different network. In the first case, Client A 41 is registered with the terminating IMS network 43, and is precondition enabled, while the originating client 44 or its network does not support QoS preconditions. The originating client 44 tries to initiate a session with terminating Client A 41 by sending, at step 401, an SDP Offer, which is forwarded to the terminating IMS Core 43, but without any mention of preconditions. Instead of rejecting the offer, or allowing it to proceed without any QoS preconditions, at step 402 the inter-working function in the terminating IMS Core 43 forwards the Offer to Client A, together with an indication of QoS preconditions requirements both for the originating and the terminating sides. The inter-working function and Client A negotiate the session using appropriate QoS to meet the preconditions (more detail of the signalling involved will be provided below). The terminating IMS Core 43 can then control, at step 403, the set-up of the required QoS bearer 47 that will provide the required QoS at the bearer plane via the IP-CAN 46. Once required QoS resources are available, at step 404 the QoS-IWF continues with the IMS session set-up towards the terminating Client A 41, including an indication that the QoS Preconditions at the originating side have been fulfilled. The terminating IMS Core 43 can then provide a final SDP Answer (without any mention of preconditions) to the originating network/client 44 in step 405. In this way a session is established that complies with the QoS preconditions required by the terminating IMS Core NW for that session and supported by Client A, but avoiding ghost ringing, even though the originating client/network does not support preconditions.

A similar process occurs when an originating client 45 and network, that do support preconditions, originate a session with Client B 42, registered at a terminating IMS network 43 and not precondition enabled. Here, at step 406 the originating network sends an SDP Offer, together with the preconditions required to establish a QoS Assured session, to the terminating IMS core 43. This SDP offer is intercepted by the QoS-IWF at the terminating IMS core 43 which will not progress the IMS Session set-up towards the terminating Client B 42 in step 407 until the required QoS bearer 47 is available after execution of step 403 (as above) and the originating client 45 indicates that its local resources are also available in step 406. At step 407, the inter-working function in the IMS core 43 forwards an SDP Offer to Client B, but without the preconditions, and Client B 42 finally completes the IMS Session set-up returning an SDP answer at step 408. In this way a QoS-Assured session is established that complies with the preconditions specified by the originating client/network, and avoiding any possibility of ghost ringing even though Client B is not precondition enabled.

Figure 5:
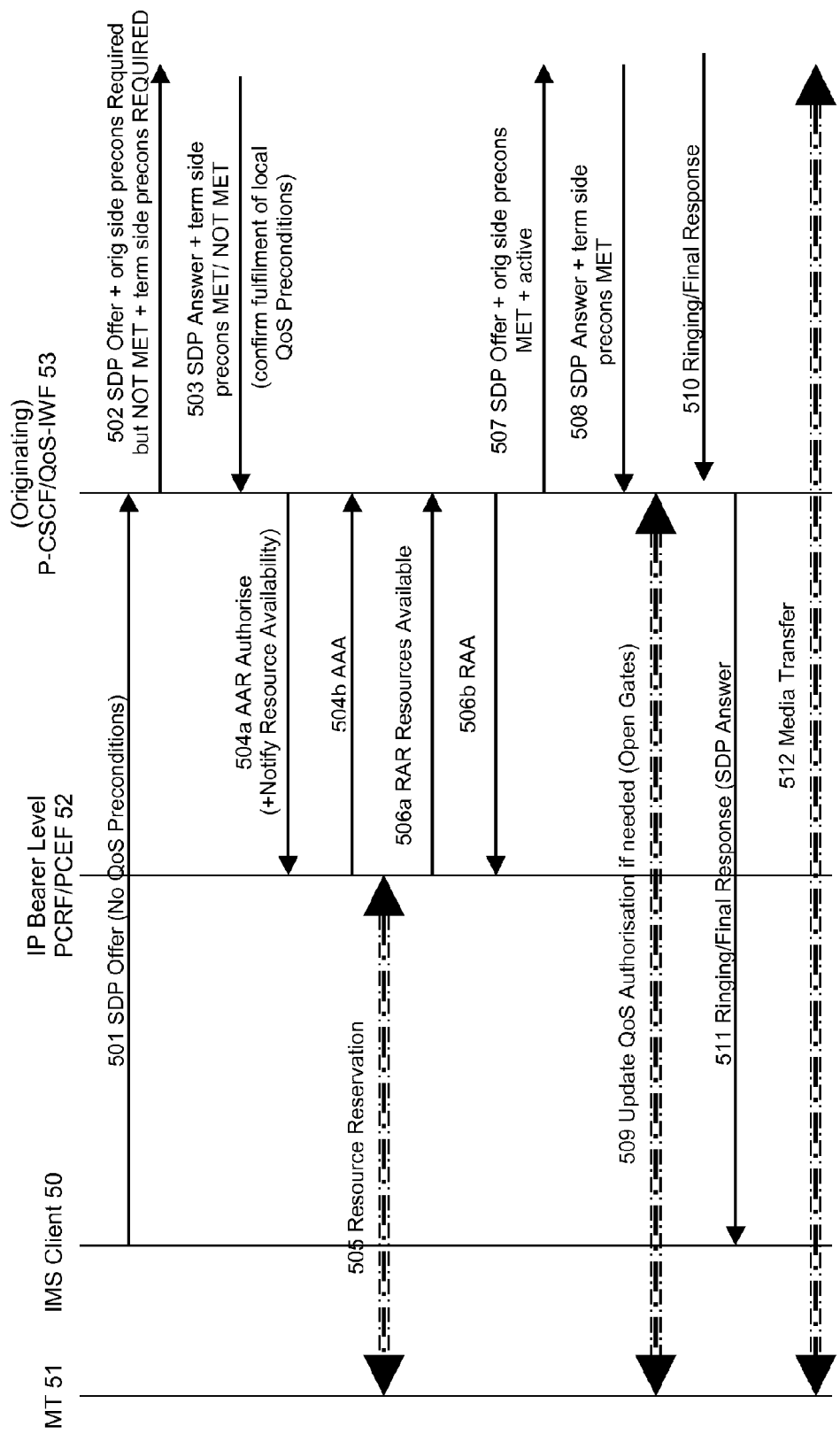
FIG. 5 is a signal flow diagram for an embodiment of the invention as set out in FIG. 3.

FIG. 5 illustrates in more detail the signal flows of an embodiment where the control of QoS Preconditions occurs in the IMS-Core on the originating side, on behalf of the originating client 50. For the purposes of this and the ensuing discussion of FIGS. 5 to 8, the term client is used to refer to the originating or terminating ends of the SIP signaling flows, whereas the term mobile terminal, MT, is used to refer to the ends of the session media data flows at the bearer level. It will be appreciated that both may be part of the same device or UE, or implement an interface that provides information on the status of QoS Resources to the SIP Client. As shown in FIG. 5, Client 50 works with an MT 51. The QoS-IWF is implemented in a P-CSCF 53 in the originating side IMS-Core.

At step 501, the originating client 50 sends an initial SDP offer to the P-CSCF 53 in the originating side IMS-Core. The originating client 50 might declare the support of QoS Preconditions, or might not, but no QoS Precondition requirements are included with the SDP offer. This is taken as an indication that the client 50 is operating without QoS preconditions (for this request). On receiving the offer, the QoS-IWF within the P-CSCF 53 decides whether this type of request requires assured QoS. The determination is based on the type of request, the information included in the request, and the policies applied by the operator of the IMS network. If the QoS-IWF 53 determines that the session can only proceed if it is QoS-Assured, then it activates the related procedures to act on behalf of the originating client 50. The QoS-IWF 53 enforces the establishment of a QoS-Assured session by inserting QoS Preconditions into the initial SDP offer to generate a modified SDP offer as follows:

Local side's (i.e. the originating side's) QoS preconditions are set as required and NOT MET;

Remote side's (i.e. the terminating side's) QoS preconditions may be set as required or desired (in FIG. 5 they are shown set as required).

The QoS-IWF 53 sends the modified SDP offer to the terminating side network/client at step 502. When received at the terminating side the terminating user terminal will not ring until required resources are available at the originating side.

At step 503, the terminating side responds with an SDP Answer. This Answer contains an indication of the level of fulfillment of the QoS Preconditions at the remote, terminating side (MET/NOT MET) at the time the answer was sent. Since the originating, local side indicated in the modified SDP Offer that local resources were NOT MET, the SDP answer includes a request to be notified when QoS Preconditions at the originating side are MET.

The P-CSCF/QoS-IWF 53 does not forward the SDP Answer received at step 503 back to the client 50. Instead, at step 504a, the P-CSCF/QoS-IWF 53 initiates a resource reservation procedure. It provides an AAR Authorization of QoS Resources according to negotiated session characteristics, which were specified in the SDP Answer at step 503, to the underlying IP-bearer level (PCRF/PCEF 52). At step 504b, the PCRF/PCEF 52 returns an AAA Authorization Answer.

At step 505, the required resources in the bearer plane are reserved. The PCRF determines a set of PCC rules based on the negotiated session parameters and provides these to the PCEF. If the Bearer Control Mode selected for the IP-CAN is network-initiated, then the PCEF will initiate the reservation of required resources. However, if the Bearer Control Mode selected for the IP-CAN is UE-initiated, then the default bearer is used (PCC rules are bound to the default bearer).

At step 504a, the originating P-CSCF/QoS-IWF 53 also includes a request that the PCRF 52 sends it a notification of the availability of corresponding resources. One example of a way that this can be done is by using a new "INDICATION_OF_RESOURCES_AVAILABLE" value for the Specific-Action Attribute Value Pair (AVP) sent over the Rx interface (see FIG. 2). Therefore, the PCRF 52 sends a notification to the P-CSCF/QoS-IWF 53 that the required resources have become available. This may be done either by: a) having the PCRF hold the AAA Answer to the AAR command in step 504a until the resource availability is confirmed, and then including the confirmation in the AAA Answer; or b) with a RAR Resources Available message as shown at step 506a. This may include the Specific-Action AVP set to INDICATION_OF_RESOURCES_AVAILABLE together with corresponding Media-Component AVPs. The P-CSCF/QoS-IWF 53 acknowledges this with an RAA message at step 506b.

At step 507, once the originating P-CSCF/QoS-IWF 53 has been made aware that required resources are available, it sends another SDP offer (based on the reserved QoS resources at the originating side) to the terminating network/client with the QoS Precondition status of the originating side set to MET (and active). When received at the terminating side this will indicate to the terminating client's UE that it can start ringing as soon as resources in the terminating side are confirmed.

At step 508, when the terminating side has established the required bearer resources it responds with an SDP answer with QoS Preconditions at the terminating side also set to MET.

At step 509, the originating P-CSCF/QoS-IWF 53 updates the QoS Authorization if needed (e.g. if SDP answer in step 503 differs from SDP answer in 508) and opens the gates so that the session communications can proceed.

At step 510, the originating P-CSCF/QoS-IWF 53 receives a final response from the terminating side, which may include an indication that the terminating side UE is ringing. At step 511 the originating P-CSCF/QoS-IWF 53 includes the latest SDP answer received from the terminating side within a ringing indication or directly within the Final SIP Response.

Finally, at step 512, the session is established and media can flow between the communicating peers. Because the P-CSCF/QoS-IWF 53 ensures that the required resources are provided to meet the QoS Preconditions for a QoS-Assured session, before the terminating side UE rings, this eliminates the possibility of "Ghost Ringing".

For the case where the originating user owns a split terminal that does not support use of QoS Preconditions (i.e. does not have a QoS Application Program Interface, API) and where the MT 51 operates a UE-initiated Bearer Control Mode, only the default bearer could be used. However, for the split terminal case where the MT 51 is able to operate a Network-initiated Bearer Control Mode, the IP-CAN will establish the dedicated bearer resources at step 505 using the correct bearer in accordance with the policies determined by the IMS network.

Figure 6:
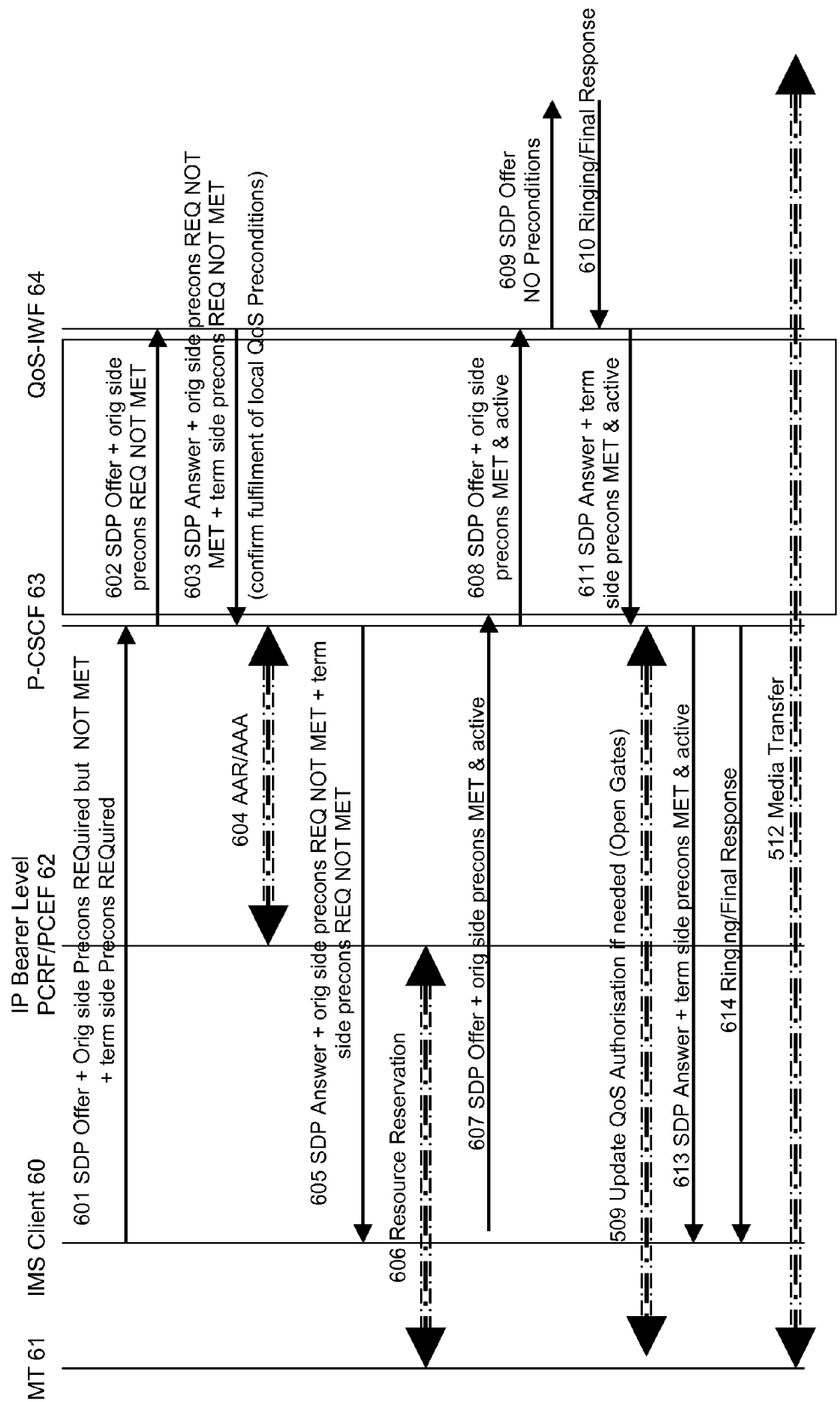
FIG. 6 is a signal flow diagram for another embodiment of the invention as set out in FIG. 3

FIG. 6 illustrates in more detail the signal flows of an embodiment where the control of QoS Preconditions occurs in the IMS-Core on the originating side, on behalf of the terminating Network/Client. An originating IMS client 60 works with an MT 61. A P-CSCF 63 and a QoS-IWF 64 in the IMS Core are here shown as separate entities, although they may both be configured at the same network node (i.e. in the P-CSCF 63). However, in this case it may be preferred to locate the QoS-IWF at the border of the IMS Core.

At step 601, the P-CSCF 63 on the originating side receives a SIP request to establish a session in the form of an initial SDP offer from the IMS client 60. This includes QoS Preconditions requirements for both the originating and terminating sides. At step 602, the originating P-CSCF 63 progresses the SIP request within its IMS Core domain in the usual way.

However, before the SDP offer is forwarded to the terminating side the SIP request is intercepted by the QoS-IWF 64, which decides whether the remote Network/Client identified in the request requires assured QoS (based on the type of request, information included in the request, the identity of the destination Network/Client and according to operator policy). When the QoS-IWF 64 determines that QoS Assured sessions are not required or not possible (e.g. because the destination Network/Client does not support use of QoS Preconditions, a fact that the QoS-IWF could determine from the Service Level Agreements of the IMS networks), instead of rejecting the request, the QoS-IWF 64 enables the establishment of the SIP Session without the use of QoS preconditions on the terminating side while still enabling the originating client to use QoS preconditions, as specified in the original SDP Offer.

In this case, the QoS-IWF 64 does not progress the SDP Offer towards the terminating Network/Client. Instead, at step 603, the QoS-IWF sends an SDP Answer back to the originating P-CSCF 63 with QoS Preconditions requirements from the terminating side set as Required and NOT MET. The QoS-IWF 64 will also include within the SDP answer a request to be notified when QoS Preconditions at the local side are MET.

At step 604 the originating P-CSCF 63 provides the underlying IP bearer layer (PCRF/PCEF 62) with an AAR Authorization in the usual way. The PCRF/PCEF 62 returns an AAA Answer. At step 605 the P-CSCF 63 sends the SDP Answer received from the QoS-IWF 64 to the originating Client 60.

At step 606 the required QoS resources are reserved. Again, depending on the Bearer Control Mode selected for the IP-CAN, this may either be initiated by the MT 61 or, if network-initiated, by the PCEF in accordance with the "negotiated" SDP media characteristics.

Once the originating side resources are available, then at step 607 the originating client sends a new SDP Offer, this time confirming that local resources are now available (i.e. QoS Preconditions set to MET). At step 608, the P-CSCF 63 progresses the SDP offer within the originating side IMS-Core domain. Note that in this case no additional signaling via the PCC infrastructure is required to indicate to the QoS-IWF 64 that local resources are available. The originating client 60 already provides this information in the SIP SDP Offer.

Once the originating side QoS-IWF 64 is aware that required resources are available, at step 609 it sends an SDP Offer to the destination Network/Client without including any QoS Precondition signaling. At step 610 the terminating side responds with an SDP answer, which may (or may not) include a Ringing indication.

At step 611, the originating QoS-IWF 64 sends an SDP Answer to the P-CSCF 63, which includes an indication that QoS Preconditions are satisfied on the terminating side (Preconditions set as MET and active). At steps 612 to 615, the originating P-CSCF 63 handles the SDP Answer so that the Session can be established, in the same way as described above in steps 509-512 for the procedure shown in FIG. 5. QoS Authorization is updated (if required) and gates are opened and the SDP answer is forwarded to the local Client. At step 614, the QoS-IWF 64 provides a Final Response, optionally preceded by a Ringing indication. In this way, the session is established and media can flow between the communicating peers without the problem of "Ghost Ringing".

In the procedures described above in association with FIGS. 5 and 6 the QoS-IWF is located in the originating IMS-Core network (as summarized in FIG. 3). However, in embodiments of the invention similar procedures are adopted when the QoS-IWF is located in the IMS Core network at the terminating side of the session (as summarized in FIG. 4). The situations that may arise include the case where neither the originating client nor the originating IMS-Core supports or enforces the establishment of QoS Assured sessions, but the terminating network/client does—for example, in the case of a client with a SIP UE calling from a fixed IMS system to a 3GPP IMS Subscriber whose UE supports the use of QoS Precondition signaling. Another situation that may arise is the case where the originating UE or the originating IMS-Core supports and uses the establishment of QoS Assured sessions but the terminating client's UE does not support the use of QoS Preconditions. This might arise when the terminating user makes use of a split terminal.

Figure 7:
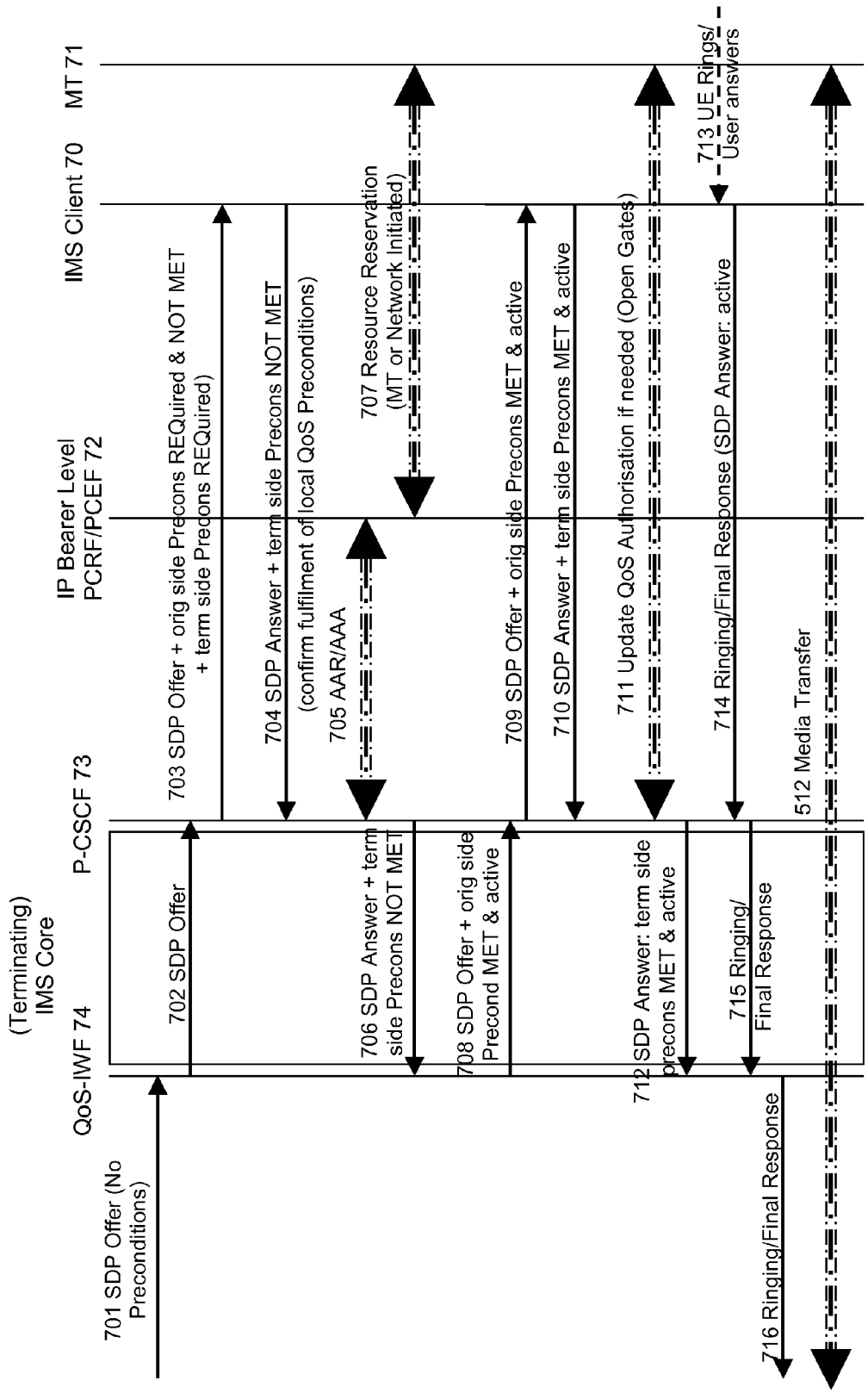
FIG. 7 is a signal flow diagram for an embodiment of the invention as set out in FIG. 4.

FIG. 7 depicts the signal flows for control of QoS Precondition Signaling at the terminating IMS-Core with a QoS-IWF 74 acting on behalf of the originating network/client that is not using preconditions. In this example, a terminating IMS client 70, with mobile terminal 71, supports use of QoS preconditions. The terminating IMS Core includes a P-CSCF 73, and, as in the case described above and shown in FIG. 6, the QoS-IWF 74 is shown as a separate network entity, and is preferably placed at the border of the terminating IMS-Core domain.

At step 701 the terminating IMS-Core receives an initial SDP offer without the support or use of QoS Precondition signaling. The QoS-IWF 74 determines if QoS Assurance is required for the type of session requested. If required, then at step 702 the QoS-IWF 74 inserts QoS Preconditions signaling in the SDP offer progressed within the terminating IMS-Core domain on behalf of the originating client. The remote (originating) side QoS Preconditions are set to NOT MET, while the preconditions for the local (terminating) side may be set to Required or Desired (in FIG. 7 they are shown as Required). This allows the terminating P-CSCF 73 and terminating IMS client 70 to continue the IMS session set-up and its corresponding resource reservation, as if it were interacting with a peer supporting the preconditions, as shown by the signaling in steps 703-707.

At step 708, the QoS-IWF 74 generates another SDP offer, this time indicating that QoS Preconditions at the remote (originating) side have been fulfilled. Note that the QoS-IWF 74 sends the SDP Offer even though it does not actually know if the originating side preconditions are fulfilled. It does this to allow the session set-up to progress so that the terminating client 70 completes the SIP signalling with QoS Preconditions once resources are available. The QoS-IWF 74 can generate this SDP offer while steps 703-706 are still being executed. In steps 709-715 the terminating P-CSCF 73 and IMS Client 70 complete the session set-up as in a normal case (i.e. as though preconditions were supported by the originating client/network) without the risk of Ghost Ringing at the terminating user. In this process, at step 712, the terminating QoS-IWF 74 provides an SDP answer to the original SDP offer. This SDP answer is in accordance with the last negotiated media characteristics where resources have already been assigned.

Figure 8:
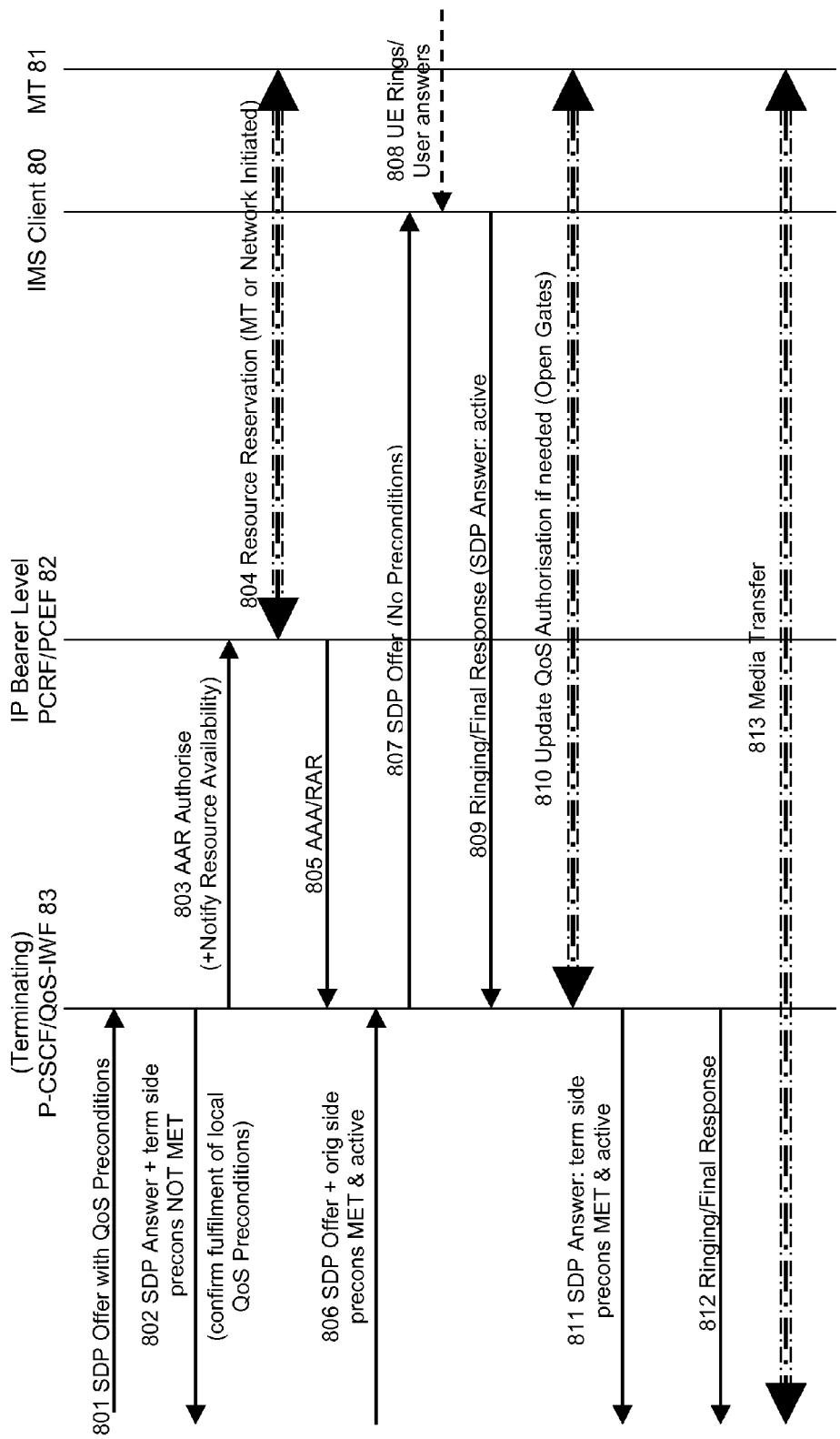
FIG. 8 is a signal flow diagram for another embodiment of the invention as set out in FIG. 4.

FIG. 8 depicts the control of QoS Precondition signaling at the terminating IMS-Core when a terminating IMS Client 80, with a mobile terminal 81, does not support use of QoS Preconditions.

Regardless of whether the originating client or network enforces the establishment of QoS-Assured sessions making use of QoS Preconditions, if the terminating Client 80 does not support QoS Preconditions, then according to the IETF's Request for Comments RFC 3312 "Integration of Resource Management and Session Initiation Protocol (SIP)", the UE of the terminating client 80 would reject the initial offer, waiting for the establishment of a new session without the use of Preconditions. However, in this embodiment of the invention, where QoS-Assured sessions are enforced at the terminating side, the terminating P-CSCF 83 implements a QoS-IWF. On receiving a SDP Offer with QoS Preconditions, at step 801, the P-CSCF/QoS-IWF 83 holds the forwarding of the initial SDP offer until the resources required (as specified by the QoS preconditions in the offer) are available at the terminating side. In this case, where QoS Preconditions are included within the original SDP offer, at step 802 the terminating P-CSCF/QoS-IWF 83 fakes an SDP Answer in order to allow the reservation of required resources to progress at the originating side.

At steps 803-805, the P-CSCF/QoS-IWF 83 initiates the reservation of resources at the terminating side that will comply with the QoS preconditions, by specifying appropriate resource requirements in an AAR Authorization message at step 803. This is performed by the PCRF/PCEF 82 (although it may be initiated by the MT 81 or by the PCRF/PCEF 82, as described above in the embodiment of FIG. 5). At step 805, the PCRF/PCEF 82 sends an AAA/RAR signal back to the P-CSCF/QoS-IWF 83, which indicates that the required resources are available at the terminating side. At step 806, another SDP Offer from the originating side indicates that the resources are available at the originating side. Only now, at step 807, does the terminating P-CSCF/QoS-IWF 83 send an SDP offer (without any precondition signaling) to the terminating Client 80.

At step 808 the UE of the terminating client 80 rings, and at step 809 the UE provides an SDP answer potentially preceded by a ringing indication. The IMS-Core may have to update the initial reservation of resources according to the SDP answer if required (step 810). Finally, at step 811, the terminating P-CSCF/QoS-IWF 83 provides an SDP answer to the originating side and completes the session establishment (steps 811-812). Again the problem of "Ghost Ringing" is avoided.

From the above description relating to FIGS. 7 and 8, it can be seen that the QoS-IWF takes different actions depending on the capabilities of the terminating network/client with regards to the support of QoS preconditions. On receiving an initial SDP offer, the QoS-IWF only knows about the declared support of QoS preconditions of the originating UE. However it ignores whether the terminating UE supports QoS Preconditions or not.

In accordance with an alternative embodiment, the QoS-IWF is made aware of the support of QoS Preconditions at the terminating network/client based on a local configuration of destination domains and addresses. This may be done in a number of ways, three of which are:

1. The P-CSCF/QoS-IWF is preconfigured with UE capabilities. In other words the P-CSCF/QoS-IWF includes access to a memory having a database of subscriber's UE capabilities. Thus, when it receives the initial SDP Offer, it can check the database to learn the QoS capabilities of the UE of the destination address.
2. The P-CSCF/QoS-IWF forwards the initial SDP offer to the client within a SIP request indicating that a QoS Preconditions SIP extension is required. If the terminating UE does not support QoS Preconditions, it will reject the request and the P-CSCF/QoS-IWF learns from the rejection that the terminating UE does not support QoS preconditions (the terminating UE answers with an error indicating that QoS Preconditions are not supported). Thereafter the P-CSCF/QoS-IWF continues as in step 802 of FIG. 8. Otherwise, if the destination client does support use of QoS preconditions, the session set-up can proceed as in FIG. 7 (steps 702 onwards).
3. The terminating UE declares its support of QoS preconditions when it initially registers with the IMS network. The P-CSCF/QoS-IWF includes a memory that caches this information while the client remains registered to IMS.

From the discussion above it will be seen that the present invention allows peer-to-peer IMS sessions to proceed, avoiding the risk for ghost ringing even if the originating or terminating UEs do not support the QoS Precondition Framework. It therefore allows operators to provide the services of an IMS system to users of UEs that do not support the QoS Precondition Framework.

The invention claimed is:

1. A method of establishing a session between client user terminals accessing IP Multimedia Subsystem (IMS) networks, the method comprising:
   receiving, at an inter-working function (IWF) located in one of the IMS networks, an IMS session initiation request originated by an originating client, the request indicating a terminating client for the session;
   determining, based on the IMS session initiation request, that the IMS session initiation request requires the use of Quality of Service (QoS) preconditions, that the originating client is not using QoS preconditions, and that the terminating client, or IMS network with which the terminating client is registered, requires the use of QoS preconditions;
   forwarding, by the IWF, a set of QoS preconditions along with a session description protocol (SDP) offer on behalf of the originating client that is not using QoS preconditions, to the IMS network with which the terminating client is registered; and
   completing the session establishment only after QoS resources complying with the set of QoS preconditions have been established by the terminating client.

2. The method of claim 1 wherein the IWF is located in the core IMS network with which the originating client is registered.

3. The method of claim 2, wherein the IWF initiates the procedure for the authorization of QoS resources for the originating client in compliance with the set of QoS preconditions.

4. The method of claim 3 wherein the IWF initiates the procedure for the authorization of QoS resources by sending instructions to a Policy and Charging Control (PCCEJ) function together with a request to be notified when the corresponding QoS resources become available to the originating client.

5. The method of claim 4, wherein the PCC sends an indication that the QoS resources have been established to the IWF.

6. The method of claim 5, wherein on receiving the indication that the QoS resources have been established for the originating client, the IWF sends a new SDP offer related to the original one towards the terminating client, the new SDP offer including an indication that the QoS Preconditions requirements at the originating client have been fulfilled.

7. The method of claim 6, wherein the IWF intercepts SDP answers from the terminating client and wherein the IWF does not allow them progress to the originating client until required QoS resources at the originating client are available and QoS preconditions requirements for the terminating client are fulfilled.

8. The method of claim 7, wherein the IWF intercepts a final SDP answer from the terminating client indicating that required QoS preconditions at the terminating client are fulfilled, and wherein the IWF forwards said final SDP answer to the originating client but without any indication of QoS precondition requirements/fulfillment.

9. The method of claim 1, wherein the session initiation request includes an SDP offer including an indication that the originating client supports use of preconditions, and the IWF determines that the terminating client, or IMS network with which the terminating client is registered, is not using QoS preconditions, and wherein the IWF does not allow progress of the session initiation request towards the terminating client and instead provides an SDP Answer towards the originating client including an indication of QoS precondition fulfilment at the terminating client together with a request to provide the terminating client with a confirmation of when QoS resources for the originating client become available.

10. The method of claim 9 wherein the IWF sends an offer to establish the session to the IMS network with which the terminating client is registered after the QoS resources have been established for session media transfer between the originating client's mobile terminal and the IMS network with which the originating client is registered, wherein this offer does not include any indication of QoS Precondition requirements or fulfilment.

11. The method of claim 10 wherein the IWF intercepts a final SDP answer from the terminating client and wherein the IWF forwards this final SDP answer towards the originating client including an indication that required QoS preconditions at the terminating client are also fulfilled.

12. The method of claim 1 wherein the IWF is located in a core of the IMS network with which the terminating client is registered.

13. The method of claim 12, wherein the session initiation request does not contain an indication that the originating client is using QoS preconditions, and wherein the IWF determines that the terminating client, or IMS network with which the terminating client is registered, requires the use of QoS preconditions and wherein the IWF forwards an offer to establish the session together with an indication of required QoS preconditions, towards the terminating client.

14. The method of claim 13, wherein the IWF intercepts interim SDP answers from the terminating client indicating that required QoS preconditions requirements for the terminating client are not yet fulfilled and wherein the IWF does not progress these interim SDP answers towards the originating client.

15. The method of claim 13 wherein the IWF sends a further offer towards the terminating client indicating that QoS precondition requirements at the originating client/network have been fulfilled.

16. The method of claim 12 wherein the IWF intercepts a final SDP answer from the terminating client indicating that required QoS preconditions at the terminating client are fulfilled, and wherein the IWF progresses this final SDP Answer towards the originating client but without any indication of QoS precondition requirements/fulfillment.

17. The method of claim 9, wherein the session initiation request includes an indication that the originating client and IMS network with which the originating client is registered supports use of preconditions, and the IWF determines that the terminating client is not using QoS preconditions, wherein the IWF does not allow progress of the session initiation request towards the terminating client but in order to allow the originating client and IMS network to establish required QoS Resources at the originating side, the IWF instead provides an SDP Answer towards the originating client including an indication of QoS precondition fulfilment at the terminating client and a request to provide the terminating client with a confirmation of when QoS resources for the originating client become available.

18. The method of claim 17, wherein the IWF initiates the procedure for the authorization of QoS resources for session media transfer between the terminating client's mobile terminal and the IMS network with which the terminating client is registered, in compliance with QoS preconditions requirements determined by the IWF.

19. The method of claim 18 wherein the IWF initiates the procedure for the authorization of QoS resources by sending instructions to a Policy and Charging Control, PCC, function.

20. The method of claim 19, wherein the PCC sends an indication that the QoS resources have been established to the IWF.

21. The method of claim 17 wherein the IWF sends an offer to establish the session to the terminating client after the QoS resources have been established for session media transfer with the terminating client's mobile terminal and the originating client has confirmed that its QoS resources are available.

22. The method of claim 21 wherein the IWF intercepts a final SDP answer from the terminating client and forwards this final SDP answer towards the originating client wherein the IWF includes an indication that required QoS preconditions at the terminating client are also fulfilled.

23. The method of claim 1 wherein the IWF determines whether the terminating client, or IMS network with which the terminating client is registered, requires the use of QoS preconditions and if so, which specific QoS preconditions should be fulfilled prior to the completion of the establishment of a particular IMS session based on any combination of Service Level Agreements and/or IWF configuration and/or operator policies known by the IWF.

24. The method of claim 17, wherein the IWF is made aware of the support of QoS Preconditions at the terminating network/client based on a local configuration of destination domains and addresses.

25. The method of claim 24 wherein the IWF obtains information about the support of QoS Preconditions at the terminating network/client from data stored in a memory storing data relating to client capabilities.

26. The method of claim 24 wherein the IWF sends a message to the terminating client requesting an indication of whether or not it supports QoS preconditions.

27. The method of claim 26 wherein the IWF forwards the initial SDP offer to the terminating client within a SIP request indicating that a QoS Preconditions SIP extension is required.

28. The method of claim 24 wherein the terminating client declares its support of QoS preconditions when it initially registers with the terminating IMS network, and the IWF caches this information while the client remains registered.

29. The method of claim 1, further comprising:
sending, by the IWF, a SDP offer answer, from the terminating client to the originating client, wherein the SDP offer answer does not include the set of QoS preconditions.

30. An IP Multimedia Subsystem (IMS) network entity that comprises a Quality of Service (QoS) Precondition Inter-Working Function (IWF) operable for establishing a session between a client accessing the IMS network and a client accessing another IMS network, the IMS network entity comprising:
at least one processor: and
a non-transitory computer-readable storage medium including computer-readable instructions, when executed by the at least one processor, are configured to:
receive, at the IWF, an IMS session initiation request originated by an originating client, the request indicating a terminating client for the session,
determine, based on the IMS session initiation request, that the IMS session initiation request requires the use of QoS preconditions, that the originating client is not using QoS reconditions and that the terminating client, or IMS network with which the terminating client is registered, requires the use of QoS preconditions,
forwarding, by the IWF, a set of QoS preconditions along with a session description protocol (SDP) offer on behalf of the originating client that is not using QoS preconditions, to the IMS network with which the terminating client is registered, and
completing, by the IWF the session establishment only after QoS resources complying with the set of QoS preconditions have been established by the terminating client.

31. The IMS network entity of claim 30 wherein the Inter-Working Function is comprised in a Proxy-Call Session Control Function.

32. The IMS network entity of claim 31 wherein the Inter-Working Function is comprised in a network node located at a border of the IMS core network.

* * * * *

UNITED STATES PATENT AND TRADEMARK OFFICE
CERTIFICATE OF CORRECTION

PATENT NO. : 8,572,258 B2
APPLICATION NO. : 12/812665
DATED : October 29, 2013
INVENTOR(S) : Castellanos Zamora et al.

Page 1 of 1

It is certified that error appears in the above-identified patent and that said Letters Patent is hereby corrected as shown below:

In the Claims

In Column 15, Line 3, in Claim 4, delete "(PCCEJ)" and insert -- (PCC) --, therefor.

In Column 16, Line 27, in Claim 17, delete "clientwith" and insert -- client with --, therefor.

In Column 17, Line 22, in Claim 30, delete "processor:" and insert -- processor; --, therefor.

In Column 18, Line 7, in Claim 30, delete "reconditions" and insert -- preconditions --, therefor.

In Column 18, Line 15, in Claim 30, delete "IWF" and insert -- IWF, --, therefor.

Signed and Sealed this
Twenty-second Day of April, 2014

Michelle K. Lee
*Deputy Director of the United States Patent and Trademark Office*